United States Patent
Goel et al.

(10) Patent No.: US 11,410,278 B2
(45) Date of Patent: Aug. 9, 2022

(54) AUTOMATIC ARTIFACT REMOVAL IN A DIGITAL IMAGE

(71) Applicant: Adobe Inc., San Jose, CA (US)

(72) Inventors: Naveen Prakash Goel, Noida (IN); Vipul Aggarwal, New Delhi (IN); Sachin Beniwal, Hisar (IN)

(73) Assignee: Adobe Inc., San Jose, CA (US)

( * ) Notice: Subject to any disclaimer, the term of this patent is extended or adjusted under 35 U.S.C. 154(b) by 219 days.

(21) Appl. No.: 16/910,997

(22) Filed: Jun. 24, 2020

(65) Prior Publication Data
US 2021/0407047 A1 Dec. 30, 2021

(51) Int. Cl.
*G06T 5/00* (2006.01)
*G06T 7/136* (2017.01)

(52) U.S. Cl.
CPC ............ *G06T 5/002* (2013.01); *G06T 7/136* (2017.01); *G06T 2207/20116* (2013.01)

(58) Field of Classification Search
CPC ........... G06T 5/002; G06T 7/136; G06T 2207/20116; G06T 5/005; G06T 7/13; G06T 7/10; G06T 7/149; G06T 7/564; G06K 15/1223; G06K 15/1847; G06K 15/1871; G06V 10/993; G06V 10/25; G06V 10/267; G06V 10/273; G06V 10/44; G06V 10/457; G06V 10/46; G06V 10/752; G06V 10/755; G06V 30/40; G06V 30/155; G06V 30/1801; G06V 30/18076; G06V 30/182; G06V 30/1826; G06V 30/19027; G06V 30/19047; G06V 40/388
See application file for complete search history.

(56) References Cited

U.S. PATENT DOCUMENTS

| | | | | |
|---|---|---|---|---|
| 6,594,401 | B1* | 7/2003 | Metcalfe | H04N 1/4095 382/173 |
| 10,402,673 | B1* | 9/2019 | Slattery | G06V 30/153 |
| 2007/0003157 | A1* | 1/2007 | Eschbach | G06V 10/993 382/275 |
| 2007/0177817 | A1* | 8/2007 | Szeliski | G06T 5/003 382/162 |
| 2008/0144971 | A1* | 6/2008 | Wu | G06V 30/1444 382/289 |

(Continued)

FOREIGN PATENT DOCUMENTS

| | | | | |
|---|---|---|---|---|
| JP | 0935216 | A2 * | 11/1999 | G06T 5/00 |
| JP | 3946038 | B2 * | 7/2007 | G06T 5/005 |

*Primary Examiner* — Jose L Couso
(74) *Attorney, Agent, or Firm* — FIG. 1 Patents

(57) ABSTRACT

Techniques and systems are described for automatic artifact removal in a digital image. A segmentation map is generated that describes a magnitude of difference among pixels in a digital image. Contours may be generated that describe boundaries of objects described in the segmentation map. The contours may be filtered according to two-dimensional and three-dimensional cues to identify contours corresponding to artifacts in the digital image. For each contour corresponding to an artifact, an object mask and a sampling mask may be generated. The object mask and the sampling mask may be utilized as part of a content filling operation upon the digital image to remove the artifact, and a corrected digital image is generated that does not include the artifact.

20 Claims, 10 Drawing Sheets

(56) References Cited

U.S. PATENT DOCUMENTS

| | | | |
|---|---|---|---|
| 2012/0155754 A1* | 6/2012 | Chen | G06V 30/18076 |
| | | | 382/164 |
| 2014/0067631 A1* | 3/2014 | Dhuse | G06Q 40/10 |
| | | | 705/30 |
| 2016/0212302 A1* | 7/2016 | Frieder | G06T 7/90 |
| 2019/0281170 A1* | 9/2019 | Yokogawa | H04N 1/00029 |
| 2019/0281182 A1* | 9/2019 | Kanaya | G06V 10/50 |
| 2020/0110959 A1* | 4/2020 | Slattery | G06T 5/30 |
| 2021/0174119 A1* | 6/2021 | Slattery | G06T 3/608 |

* cited by examiner

AUTOMATIC ARTIFACT REMOVAL IN A DIGITAL IMAGE

BACKGROUND

Digital cameras are becoming increasingly accessible due to portability and inclusion into other devices such as mobile phones. Due to this, digital cameras may be used in a variety of scenarios, including scenarios in which a user of a digital camera wishes to capture a digital image of a physical document in lieu of a dedicated document scanner. However, the digital image may include artifacts that are not present in the physical document itself, an example of which is an artifact caused by a three-dimensional object (e.g., a paperclip) depicted in the digital image that is not a part of the physical document.

Conventional systems used to address these artifacts require users to manually select the area of the artifact and manually fill in the area of the artifact, such as with a digital image editing application of a computing device. For example, conventional systems may employ hole filling techniques to manually select the artifact in the digital image and manually selecting a different area of a digital image that includes colors and/or textures to be used in replacing the artifact.

Accordingly, conventional techniques as implemented by a computing device may be frustrating to the user and computationally inefficient by requiring repeated interaction with the computing device to achieve a desired result. This results in user frustration and inefficient operation of a computing device that implements conventional image editing systems.

SUMMARY

Techniques and systems are described for automatic artifact removal in a digital image. In one example, an automatic artifact removal system is configured to receive a digital image including an artifact and generate a corrected digital image with an effect of the artifact lessened or removed automatically and without user intervention. This permits the system to remove arbitrary and unknown artifacts, such as artifacts caused by occlusions, and generate corrected digital images without user input, which is not possible using conventional techniques.

The automatic artifact removal system uses a segmentation map that describes a magnitude of difference among pixels in a digital image. The segmentation map, for instance, is generated from a distance map indicating distances between each pixel and a mean pixel. Contours (e.g., closed curves describing boundaries) may be generated for objects described in the segmentation map. To identify contours associated with artifacts rather than contours associated with features of a document, the automatic artifact removal system employs multidimensional (e.g., two-dimensional and three-dimensional cues) to filter the contours. The cues leverage insights regarding common placement, size, coloration, and so forth of artifact with respect to documents in order to provide an indication whether an unknown object is an artifact or part of a document. Thus, the region identification module may utilize the cues to classify each of the contours as either an artifact or a document feature.

For each contour classified as an artifact, the artifact removal system may automatically generate an object mask indicating pixels associated with the artifact in the digital image, and a sampling mask indicating background pixels of the digital image. The object mask may be generated, for example, using graph-based segmentation techniques for object detection on the digital image to identify the artifact. The sampling mask may be generated, for example, by applying morphological operations to the object mask and subtracting the object mask from the result. A content filling technique is applied to the digital image according to the object mask and the sampling mask, thus removing and/or lessening an effect of the artifact and as part of generating a corrected digital image.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures may be indicative of one or more entities and thus reference may be made interchangeably to single or plural forms of the entities in the discussion.

DETAILED DESCRIPTION

Overview

Figure 1:
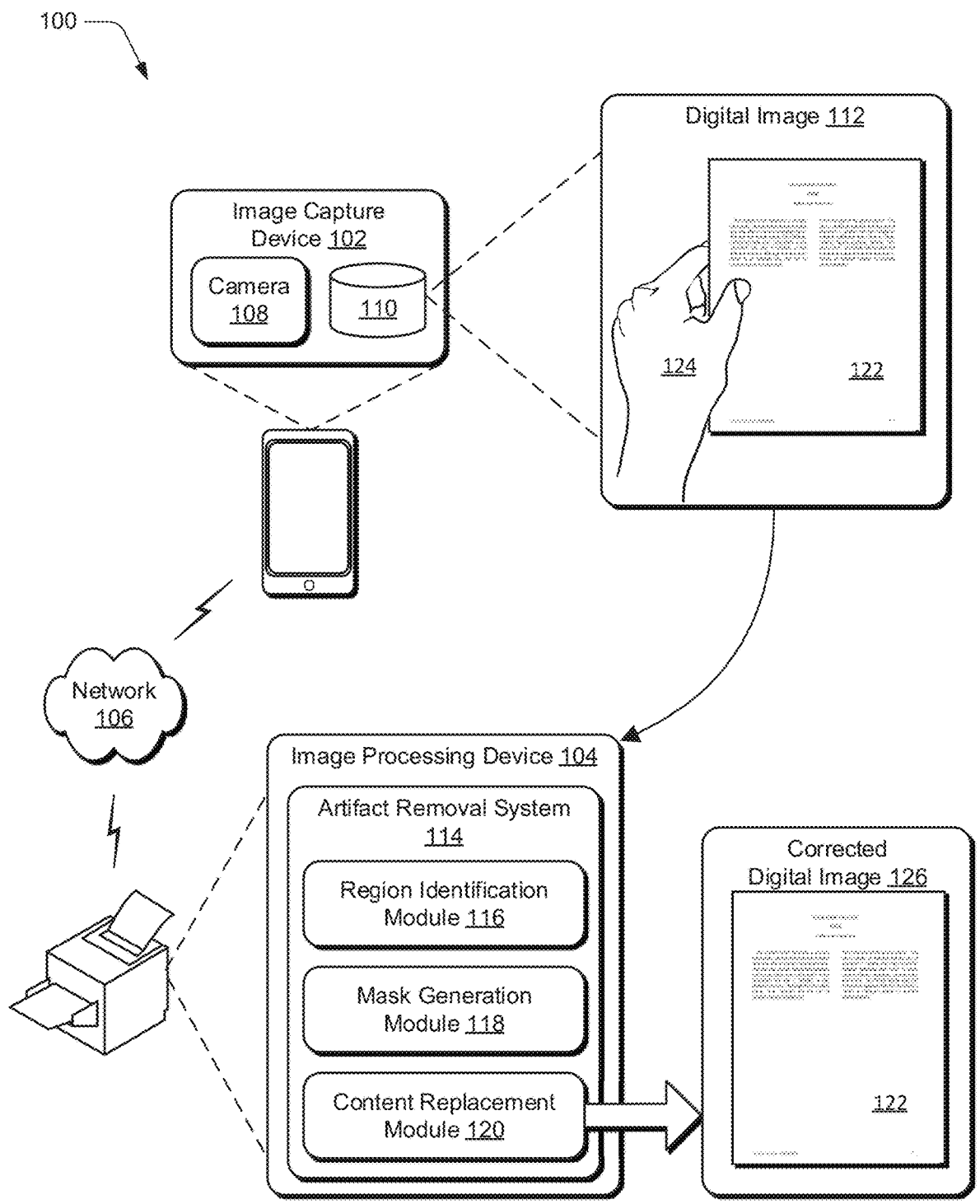
FIG. 1 is an illustration of an environment in an example implementation that is operable to employ automatic artifact removal techniques described herein.

Physical documents may be converted into digital documents through use of document scanners, digital cameras, and so forth to convert an appearance of a physical document into a digitized format as digital media. Digital images captured of physical documents by digital cameras, however, often capture objects that are not part of the physical documents and may obstruct portions of the physical documents. Conventional systems to remove artifacts, such as caused those by occlusions, using hole filling techniques are limited to complicated manual actions involving manually identifying artifacts and manually selecting material with which to replace the artifacts. Further, conventional systems for hole filling require use of digital image editing applications involving complicated manual processes and technical proficiency. Accordingly, removing artifacts from a digital image requires large amounts of a user's time and is limited to technically proficient users.

Accordingly, automatic artifact removal techniques are described that overcome the challenges of conventional techniques. In one example, an artifact removal system is configured to generate a corrected digital image having an effect of artifacts lessened and even removed, automatically and without user intervention.

The artifact removal system may employ, for instance, a region identification module to automatically identify regions of a digital image that correspond to artifacts. To do so, the region identification module generates a segmentation map describing a magnitude of difference among pixels in the digital image. This may involve, for instance, blurring the digital image and comparing pixel values in the blurred digital image to a mean pixel value for the digital image. A distance map may be generated that describes each pixel's respective distance to the mean pixel. A segmentation map may be generated by applying adaptive thresholding techniques to the distance map, and the resultant segmentation map describes objects within the digital image.

The region identification module generates contours (e.g., closed curves describing boundaries) corresponding to each of the objects described by the segmentation map, and may filter the contours according to various two-dimensional or three-dimensional cues. The cues leverage insights regarding common placement, size, coloration, and so forth of artifacts with respect to documents in order to provide an indication whether an unknown object is an artifact or part of a document. Thus, the region identification module may utilize the cues to classify each of the contours as either an artifact or a document feature.

For each contour classified as an artifact, the artifact removal system employs a mask generation module to generate an object mask and a sampling mask. The object mask describes bounds of an artifact and indicates pixels in the digital image that correspond to the artifact. The object mask may be generated, for example, using graph-based segmentation techniques for object detection on the digital image to identify the artifact. The sampling mask describes pixels in the digital image to be used as source pixels to replace pixels corresponding to the object mask. The sampling mask may be generated, for example, by applying morphological operations to the object mask and subtracting the object mask from the result. In this way, the artifact removal system may generate an object mask and a sampling mask in real time without user intervention or input.

The artifact removal system employs a content replacement module to perform a content filling technique on the digital image based on the object and sampling masks. By using pixels indicated by the sampling mask as source material to replace pixels indicated by the object mask, for instance, an effect of the artifacts is lessened and even removed from the digital image by the content replacement module.

As a result, the artifact removal system provides the digital image as a digital document that does not include artifacts, and the process of converting physical documents into digital documents is provided with increased accuracy. Accordingly, a user may capture fewer digital images when attempting to convert a physical document into a digital document, and operational efficiency is improved for image capture devices employing automatic artifact removal techniques. Further, the systems and techniques described herein provide a number of improvements over conventional techniques. For instance, the automatic artifact removal techniques described herein provide automatic artifact removal without requiring user intervention or technical proficiency with an image editing application, and further can be implemented without specialized knowledge to increase the fidelity of all document captures.

Further discussion of these and other examples is included in the following sections.

Term Examples

A "digital document" and a "digital image" refer to any electronic media content that includes a visible creation such as a design or an electronic file that embodies the visible creation. Examples of digital documents include digital graphics, digital images that include graphics, digital videos, and so forth. Examples of digital graphics include, but are not limited to, vector graphics, raster graphics (e.g., digital photographs), layouts having different types of graphics, and so forth.

A "document" is any media content that includes a visible creation such as a design or an electronic file that embodies the visible creation. Examples of documents include word processing products, marketing materials such as pamphlets, book illustrations, presentations such as slide decks, web pages, content output, via applications, combinations thereof, and so forth, and may be of any suitable format, such as a digital document (e.g., .pdf file, a .doc file, a jpeg file), a physical document (e.g., ink or toner on piece of paper), and so forth.

An "artifact" is an anomaly or alteration, in a digital image with respect to an intended subject of the digital image. Examples of artifacts include occlusions, texture corruption, alterations resulting from lossy compression techniques, digital imprecision such as pixelization, error diffusion, block boundary artifacts, ringing, contouring, posterizing, aliasing, and so forth.

An "occlusion" is an object depicted in a digital image that obstructs a view of a primary subject of the digital image. As an example, the primary subject of a digital image depicting a document is the document, and other objects in the digital image that obstruct a view of the document are occlusions.

A "contour" is a closed curve representing the outer boundaries of a region in a digital image.

"LAB color space" refers to a color space defined by the International Commission on Illumination (CIE) that expresses color as three colors: L, A, and B. The L value indicates a lightness from black to white. The A value indicates a color from green to red. The B value indicates a color from blue to yellow. The combination of the three values, L, A, and B collectively define a color that is independent of how the color is created or displayed.

A "cue" is a feature, or set of features, indicating the nature of a perceived object in a digital image. In implementations, a cue defines specified characteristics or traits of an object such that an object satisfying the cue indicates a particular nature of the object (e.g., whether the object is a part of a document or an artifact).

A "segmentation map" refers to a representation describing an intensity or magnitude of difference of pixels of a digital image. In implementations, the difference is based on a comparison to a particular pixel value, such as a mean or average pixel. For example, a segmentation map describes a magnitude for each individual pixel of a digital image as compared to a mean pixel. A segmentation map may be binary (e.g., based on a threshold amount of difference), may incorporate degrees of difference (e.g., a range of numerical values indicating an amount or amplitude of difference), and so forth.

In the following discussion, an example environment is first described that may employ the techniques described herein. Example procedures are also described which may be performed in the example environment as well as other environments. Consequently, performance of the example procedures is not limited to the example environment and the example environment is not limited to performance of the example procedures.

Example Environment

FIG. 1 is an illustration of a digital medium environment 100 in an example implementation that is operable to employ automatic artifact removal techniques described herein. The illustrated environment includes an image capture device 102 and an image processing device 104 that are communicatively coupled, one to another, via a network 106.

The image capture device 102 is depicted as including a camera 108 and a storage element 110. The camera 108 enables the image capture device 102 to capture digital images. The camera 108 may include, for instance, a lens, an aperture, a shutter, a digital image sensor, an image processor, and so forth. The camera 108 may include multiple lenses that are each configured to capture a respective digital image simultaneously, or at a similar point in time, e.g., in response to a user input to capture a digital image. The storage element 110 is configured to store media content such as one or more digital images, one or more digital videos, one or more digital documents, and so forth. In the illustrated example, the storage element 110 is illustrated as storing a digital image 112. The digital image 112 may be captured by the camera 108, transferred from a camera external to the image capture device 102, obtained from a service provider system via a network, and so forth. The digital image 112 is communicated to the image processing device 104, such as via the network 106.

The image processing device 104 includes an artifact removal system 114. The artifact removal system 114 may be provided using any suitable combination of hardware, software, firmware, and/or logic devices. The artifact removal system 114 represents functionality operable to remove an artifact from a digital image. The artifact removal system 114 may comprise a part of one or more other systems or applications, such as camera applications, media content editing applications, social networking applications, and so forth. The artifact removal system 114 may include a variety of component modules or systems configured to implement functionalities for automatic artifact removal, such as a region identification module 116, a mask generation module 118, and a content replacement module 120.

The region identification module 116 is representative of logic implemented at least partially in hardware of the image processing device 104 to identify which regions within a digital image include artifacts. The region identification module 116 may, for instance, identify an artifact caused by a three-dimensional object based on two-dimensional or three-dimensional cues within an input digital image. As an example, the digital image 112 is illustrated as including a target document 122 that is the intended subject of the digital image 112. However, in this example the digital image 112 also includes an artifact. The artifact is caused by an occlusion resulting from a user's hand 124 as obstructing corresponding portions of the target document 122.

The mask generation module 118 is representative of logic implemented at least partially in hardware of the image processing device 104 to generate an object mask and a sampling mask corresponding to the region identified by the region identification module 116. The object mask describes pixels in the digital image 112 that correspond to the occluding object and that are to be replaced. The sampling mask describes pixels in the digital image 112 that are to be used in replacing the pixels of the object mask. In the ongoing example, the mask generation module 118 generates the object mask as describing pixels in the digital image 112 depicting the hand 124. The mask generation module 118 also generates a sampling mask describing pixels in the digital image 112 in proximity to be used to replace the pixels depicting the hand. By automatically creating an object mask and a sampling mask, the automatic artifact removal techniques described herein may be performed without user intervention, in contrast to conventional image editing techniques that require user input to indicate object regions and sampling regions.

The content replacement module 120 is representative of logic implemented at least partially in hardware of the image processing device 104 to generate a corrected digital image 126. The content replacement module 120 may, for instance, utilizes the object and sampling masks generated by the mask generation module 118 to remove artifacts in the digital image 112. In the ongoing example, the content replacement module 120 uses the object mask and the sampling mask to replace pixels of the digital image 112 corresponding to the hand 124 with pixels of the digital image 112 corresponding to the target document 122, resulting in a corrected digital image 126 that portrays the target document 122 without the hand 124.

Devices that implement the image capture device 102 and the image processing device 104 may be configured in a variety of ways. In implementations, the image capture device 102 and/or the image processing device 104 is a computing device having a processing system and one or more computer-readable storage media as further described in relation to FIG. 8. A computing device, for instance, may be configured as a mobile device (e.g., assuming a handheld configuration such as a tablet or mobile phone), a desktop computer, a laptop computer, a digital camera, and so forth. Thus, a computing device may range from full resource computing devices with substantial memory and processor resources (e.g., personal computers, game consoles) to a low-resource device with limited memory and/or processing resources (e.g., mobile devices, digital cameras). Additionally, although a single device is shown in some examples, a device may be representative of a plurality of different devices, such as multiple servers utilized by a business to perform operations "over the cloud" as further described in FIG. 8.

The artifact removal system 114 is configured to operate automatically and without user intervention. For instance, the artifact removal system 114 may receive the digital image 112 and generate and output the corrected digital image 126 automatically and without user intervention. In implementations, the image processing device 104 is a printing device configured to transform digital media into a physical representation of the digital media (e.g., conversion of digital media into ink or toner on paper). In some implementations, the image processing device 104 is configured to receive the digital image 112 as an input to a printing queue, such as the image capture device 102 issuing a print command associated with the digital image 112 and communicating the print command to the image processing device 104. The image processing device 104 may employ the artifact removal system 114 and apply the automatic artifact removal techniques, automatically and without user intervention, upon receipt of a digital image for printing. Thus, the image processing device 104 may receive the digital image 112 for printing and instead print the corresponding corrected digital image 126.

In general, functionality, features, and concepts described in relation to the examples above and below may be employed in the context of the example procedures described in this section. Further, functionality, features, and concepts described in relation to different figures and examples in this document may be interchanged among one another and are not limited to implementation in the context of a particular figure or procedure. Moreover, blocks associated with different representative procedures and corresponding figures herein may be applied together and/or combined in different ways. Thus, individual functionality, features, and concepts described in relation to different example environments, devices, components, figures, and procedures herein may be used in any suitable combinations and are not limited to the particular combinations represented by the enumerated examples in this description.

Figure 2:
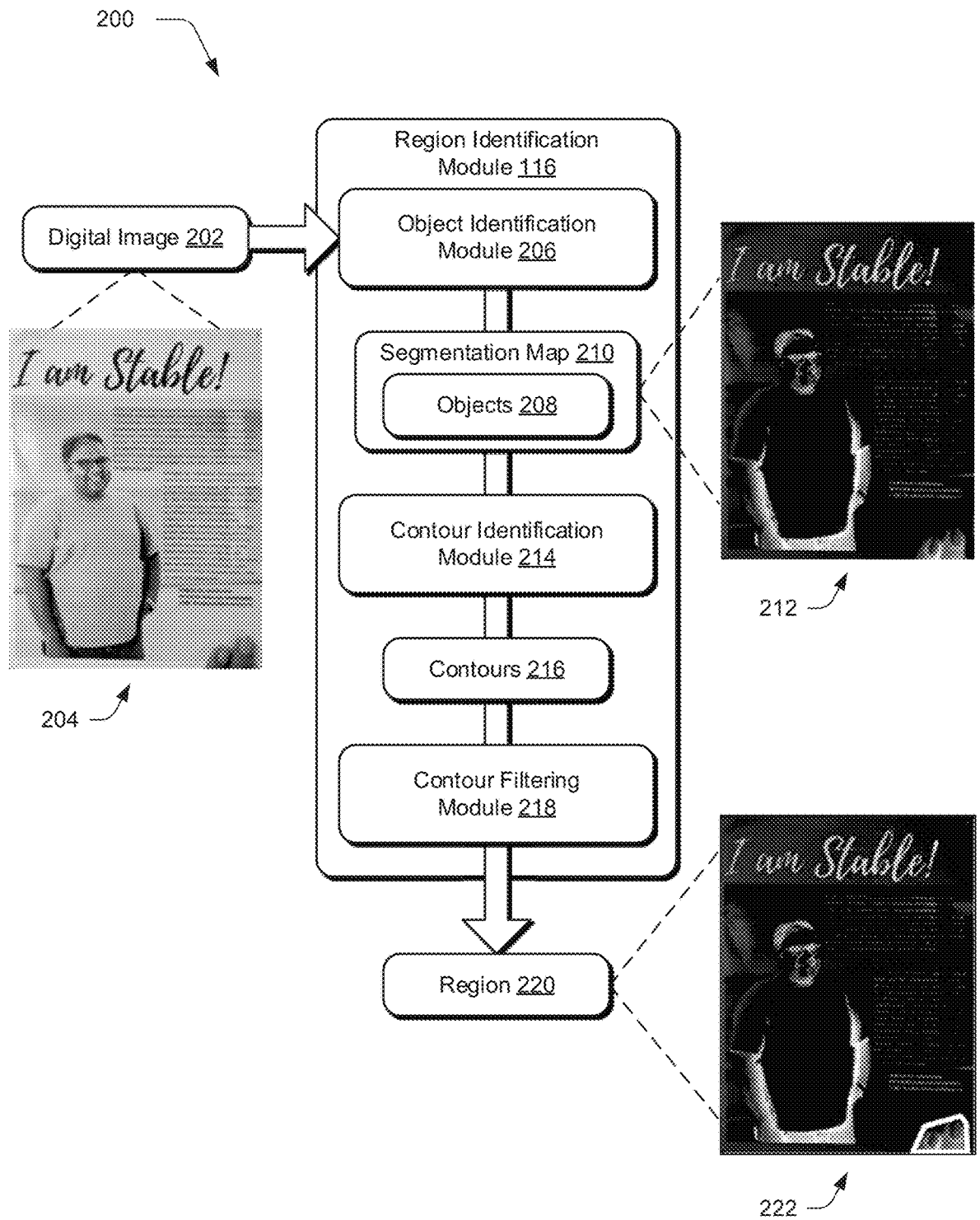
FIG. 2 depicts a system in an example implementation showing operation of an example region identification module for determining a region of a digital image corresponding to an artifact.

FIG. 2 depicts a system 200 showing an example region identification processing pipeline of the region identification module 116 of FIG. 1 in greater detail. The region identification processing pipeline begins by receipt of a digital image 202 by the region identification module 116. For example, the digital image 202 is captured by a camera 108 of the image capture device 102, received via the network 106, downloaded from a service provider, or so forth. An example digital image 202 is illustrated as digital image 204 including a document and portions of two fingers depicted at a lower-right portion of the digital image 204. The example document includes various text features and an image of a person. In this example, the fingers are not a part of the document depicted in the digital image 204, but rather are occlusions that obstruct portions of the document. In implementations, the region identification module 116 detects that the digital image 202 depicts at least part of a document. For example, the artifact removal system 114 may incorporate criteria pertaining to documents that do not hold true to all digital images, and the artifact removal system 114 may be configured in some implementations to continue operations responsive to detection of part of a document within the digital image 202 based on that criteria.

An object identification module 206 identifies objects 208 within the digital image 202. The objects 208 may include objects depicted as part of a document captured in the digital image 202, as well as occlusions that are obstructing portions of the document. The object identification module 206 may begin by blurring the digital image 202, such as by using a chain of blurs to reduce the amount of pixel intensity variation and reduce image detail. For instance, a blurred digital image $Image_{smooth}$ may be created from an input digital image Image according to the following equation:

$$Image_{smooth}=Blur_1\{Blur_2\{ \ldots Blur_N\{Image\}\}\}$$

where $Blur_1 \ldots _N$ represent blurring techniques. As an example, the object identification module 206 utilizes mean-based filtering and Gaussian kernel blurring techniques.

The object identification module 206 then converts the digital image 202 and the corresponding blurred digital image into an LAB color space as follows:

$$Image_{Lab}=LAB(Image)$$

$$Image_{smoothLab}=LAB(Image_{smooth})$$

Conversion of the digital image into an LAB color space allows for mean values to be generated for each component value represented in the LAB color space. The object identification module 206 may generate a mean of the digital image 202 in the LAB color space, according to:

$$Mean_{LAB}=Mean(Image_{LAB})$$

In this example, the mean of a digital image includes the mean of the L value, the mean of the A value, and the mean of the B value for the digital image. For instance, the L value of each pixel in the digital image is summed, and the resultant value is divided by the total number of pixels to determine the mean L value for the digital image; the A value of each pixel in the digital image is summed, and the resultant value is divided by the total number of pixels to determine the mean A value for the digital image; and the B value of each pixel in the digital image is summed, and the resultant value is divided by the total number of pixels to determine the mean B value for the digital image.

The mean of the digital image 202 may then be utilized to generate a distance map. For instance, the object identification module 206 may generate a distance map based on distances between corresponding pixels in the blurred digital image in the LAB color space and the mean digital image, such as to indicate a magnitude of difference between the values for a particular pixel in the blurred digital image to the mean pixel values. In implementations, the distance map is determined according to:

$$DistanceMap=Distance(Image_{SmoothLab}, Mean_{Lab})$$

Distances between the $Image_{SmoothLab}$ and $Mean_{Lab}$ may be determined, for instance, with a Euclidean Distance formula.

The object identification module 206 may then normalize the distance map to a standardized range of values according to:

$$Distance_{norm}=Norm(DistanceMap)$$

In implementations, the distance values are normalized to a range from 0 to 255.

The object identification module 206 may generate a segmentation map 210 that represents the objects 208 by applying thresholding techniques to the normalized distance map. The threshold allows the object identification module 206 to determine which pixels are 'different enough' from the rest of the digital image 202 to be considered as identifiable objects with the digital image 202. For instance, the object identification module 206 may utilize a threshold that is a linear combination of mean and standard deviation values for pixel values in the normalized distance map, such as according to:

$$threshold=a*mean(Distance_{norm})+b*std(Distance_{norm})$$

where a and b are constants configured to weight the mean and standard deviation values. As the distance values are normalized to a uniform range of values, the values a and b may be learned across multiple different digital images and corresponding distance maps.

In implementations, the threshold may incorporate values (e.g., the constants a and b) determined through use of machine learning. Machine learning refers to a computer representation that can be tuned (e.g., trained) based on inputs to approximate unknown functions. In particular, a machine learning model can include a model that utilizes algorithms to learn from, and make predictions on, known data by analyzing the known data to learn to generate outputs that reflect patterns and attributes of the known data.

For instance, a machine learning model can include but is not limited to, decision trees, support vector machines, linear regression, logistic regression, Bayesian networks, random forest learning, dimensionality reduction algorithms, boosting algorithms, artificial neural networks, deep learning, and so forth. Thus, a machine learning model makes high-level abstractions in data by generating data-driven predictions or decisions from the known input data. The constants a and b for the threshold, for example, may be learned from a machine learning model that analyzes known data points from manually guided artifact removal to determine optimal values for use in the threshold.

In implementations, the object identification module 206 applies the threshold through adaptive or local thresholding techniques. For instance, the object identification module 206 may use an adaptive threshold technique where the threshold value is calculated independently for each of a plurality of smaller regions, and different threshold values are applied to different portions of the digital image. This may include, for instance, splitting the digital image into a number of cells and applying a simple thresholding method to each cell as a separate digital image, performing a statistical examination of intensity values for a local neighborhood of each pixel, and so forth.

The object identification module 206 thus generates the segmentation map 210 representing the objects 208 within the digital image 202. In implementations, each pixel of the segmentation map has a value (e.g., corresponding to the normalized distance value for the pixel) indicating an intensity or magnitude of difference between the pixel and the background of the digital image 202. The values of the segmentation map may be visually represented, for instance, as grayscale colors with a lowest value displayed as black and a largest value displayed as white. In other implementations, the segmentation map is binary where pixels have a value of 0 if their normalized distance value does not exceed the threshold and a value of 1 if the normalized distance value does exceed the threshold value. An example of the segmentation map 210 is illustrated as the segmentation map 212, corresponding to the example digital image 204. In the segmentation map 212, pixels that stand out from the background of the digital image 202 appear brighter, such as the two fingers that are not part of a document, and the arms, legs, glasses, and hair of the image of the person depicted within the document.

In implementations, each of the objects 208 is determined as a continuous collection of non-zero pixels in the segmentation map 212. An object 208 represents any collection of pixels that stands out relative to the background of the digital image 202, and may or may not correspond to a visual object in the digital image 202. The object 208 may include pixels corresponding to a document in the digital image 202, pixels corresponding to an artifact in the digital image 202, and so forth. By determining the objects 208 on the basis of continuity of non-zero pixels in the segmentation map 212, the region identification module 116 does not require priors specific to particular objects (e.g., OCR, predetermined geometric shapes, and so forth) and is operable to identify any arbitrary unknown objects.

The contour identification module 214 generates a contour 216 for each respective object 208. A contour 216 is a curve (e.g., closed) representing outer boundaries of an object 208 within the digital image 202. The contour identification module 214 may use polygonal approximations to generate the contours 216, for example a convex hull algorithm that creates a smallest convex shape containing each pixel identified as corresponding to an object 208.

The contour filtering module 218 filters each of the contours 216 to determine regions 220 associated with artifacts in the digital image 202. The contour filtering module 218 does so by utilizing two-dimensional and three-dimensional cues to determine if a contour 216 is likely to be a part of a document in the digital image 202 or an artifact in the digital image 202. If the content filtering module 218 determines that a contour 216 is associated with an artifact, the contour 216 is output as a region 220.

The contour filtering module 218 may, for example, utilize three-dimensional cues to determine if a contour 216 is associated with a three-dimensional object with respect to a document in the digital image 202. Given that documents are typically two-dimensional in nature, any three-dimensional objects with respect to a document are likely to be occlusions that are not a part of the document. Various three-dimensional cues are utilized by the contour filtering module 218 to identify regions 220 that correspond to three-dimensional objects. For example, the contour filtering module 218 may employ techniques that identify shadows, estimate depth, and so forth. The presence of a shadow on a document, for instance, indicates that the object casting the shadow is not itself a part of the document. Similarly, a document may be assumed to have no depth, and any object estimated to have a depth different from the document indicates that the object is not a part of the document.

The contour filtering module 218 may also, for example, utilize two-dimensional cues to determine if a contour 216 is associated with an artifact. The two-dimensional cues may be used in addition to or as an alternative to the three-dimensional cues. As an example, a digital image 202 may include a document that depicts shadows within it, and thus two-dimensional cues may provide additional information to determine that such shadows are not indicative of an artifact. As another example, a digital image 202 may be captured in an environment with bright lighting and there may be insufficient data pertaining to three-dimensional cues (e.g., a lack of shadows) to determine artifacts on the basis of three-dimensional cues alone.

The contour filtering module 218 may utilize a variety of two-dimensional cues. Examples of two-dimensional cues include a position of the contour 216 within the segmentation map 210, an area of the contour 216, an area of an object 208 corresponding to the contour 216, an aspect ratio of the contour 216 and/or the corresponding object 208 (e.g., an aspect ratio of a smallest rectangle that contains the contour 216 or the object 208), a distance from the contour 216 to the edge of segmentation map 210, an absolute length or height of the contour 216, a relative length or height of the contour 216 with respect to the size of the segmentation map 210, color variances in the digital image 202 in locations corresponding to the contour 216, and so forth. Various ones of the two-dimensional cues may further include, for instance, minimum and/or maximum bounds for corresponding values as indicative of classification regarding whether a contour is associated with an artifact.

The various cues leverage insights regarding common placement, size, coloration, and so forth of artifacts with respect to documents. As an example, many occlusions are found near the edges of a document, such as fingers, binder clips, paper clips, staples, paperweights, and so forth. Accordingly, a contour 216 may be determined to be more likely to correspond to an artifact based on its location, proximity to an edge of the document, and so forth. Similarly, central areas of a document are often a focal point of a document, and a user is likely to take greater care in ensuring that there are no obstructions with respect to the focal point of a document while capturing the digital image 202.

Larger objects are more likely to be a part of the document, and the size of a contour 216 may be indicative of a likelihood that the contour 216 corresponds to an artifact. Further, removal of large objects is likely to create visually displeasing artifacts, and the contour filtering module 218 may be configured to classify large objects as non-obstructing to avoid the creation of these visually displeasing artifacts. Small contours are likely to be associated with characters or glyphs in a document, and thus small objects may indicate that a contour 216 is not an artifact. Accordingly, the contour filtering module 218 may employ different size-related thresholds or cues, for example to indicate a contour 216 as an artifact if it is larger than a first threshold size and smaller than a second threshold size.

The cues may be further combined with one another to create additional cues. For example, characters or glyphs associated with text often have a relatively high ratio of area of the contour 216 compared to the area of the corresponding object 208. In this way, the contour filtering module 218 leverages any number of two-dimensional and/or three-dimensional cues to evaluate whether a particular contour 216 corresponds to an artifact, and outputs the regions 220 as corresponding to artifacts.

An example segmentation map 222 is illustrated as including a region 220 associated with the occluding fingers. The region 220 (and the corresponding contour 216) is illustrated as solid white lines encapsulating the fingers. It is to be appreciated that these example digital images are provided for illustrative purposes only, and the techniques employed by the region identification module 116 may be operable without visual output (e.g., representing the objects 208, segmentation map 210, contours 216, and/or regions 220 as mathematical constructs that are not output for display). For instance, a region 220 may be represented as a set of coordinates of vertices describing a polygon, as a list of pixels included in the region 220, and so forth.

Figure 3:
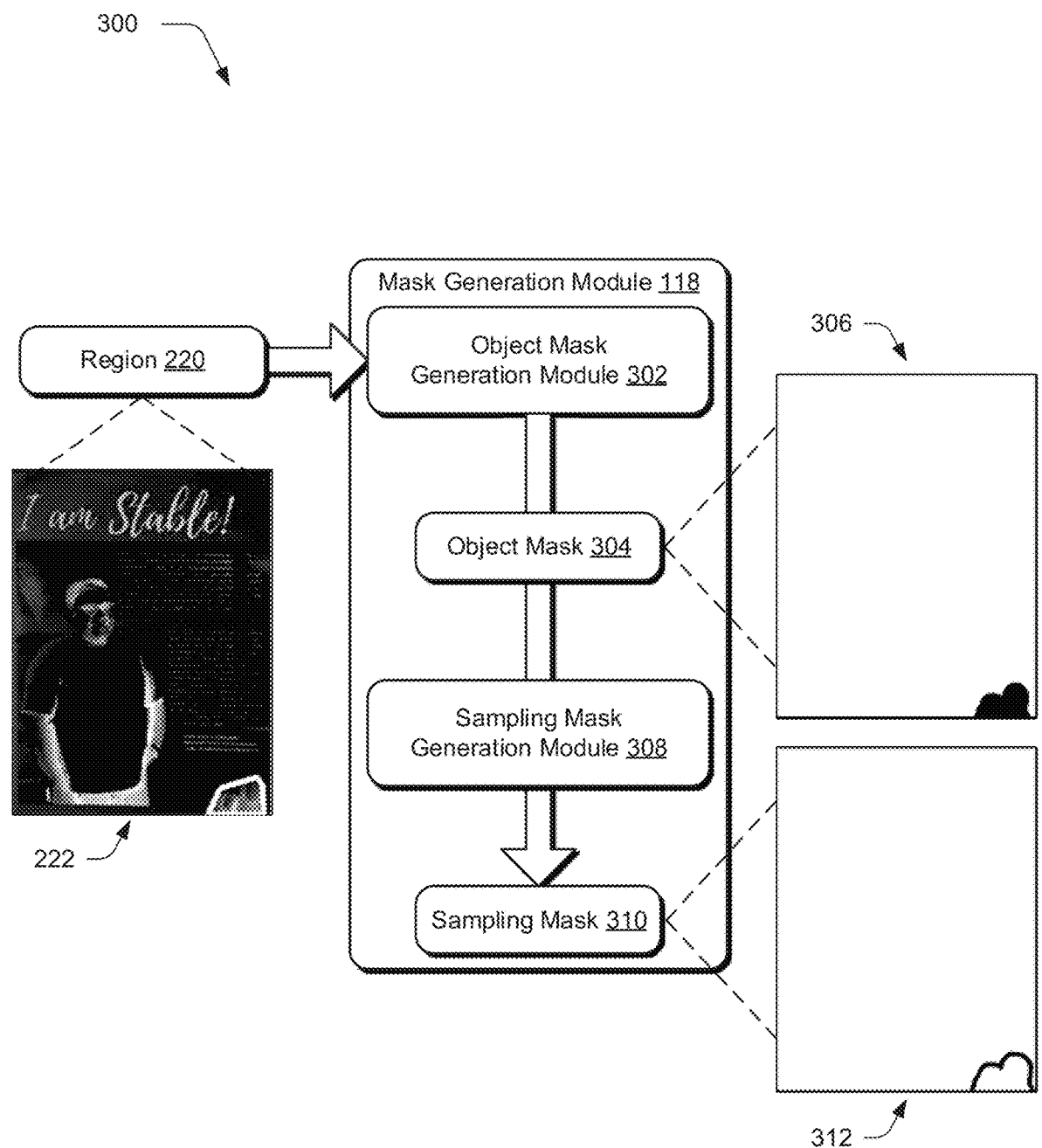
FIG. 3 depicts a system in an example implementation showing operation of an example mask generation module to generate an object mask and a sampling mask.

FIG. 3 depicts a system 300 showing an example mask generation processing pipeline of the mask generation module 118 of FIG. 1 in greater detail. The mask generation processing pipeline begins by receipt of the regions 220 by the mask generation module 118. The regions 220 are input to an object mask generation module 302 to generate object masks 304. For instance, for each respective one of the regions 220 the object mask generation module 302 generates a respective object mask 304. While the region 220 describes a general region within a digital image that includes an artifact, the object mask 304 defines precise bounds for the artifact.

In implementations, the object mask generation module 302 generates an object mask 304 by utilizing graph-based segmentation. The object mask generation module 302, for example, generates the object mask 304 by selecting a pixel within the region 220, comparing the pixel with neighboring pixels for similarity and adding similar pixels to a graph, comparing the added pixels with their neighboring pixels and adding similar pixels to the graph, and so on. In doing so, the object mask generation module 302 creates a graph containing pixels associated with a particular object that contains the initial pixel, and an object mask 304 is generated that includes each of the pixels in the graph.

While the object mask 304 may generally correspond to a same visual object in a digital image as an object 208 of FIG. 2, the object mask 304 may take a different shape, have a different size, include different pixels, and so forth when compared to a corresponding object 208. For instance, the object 208 may include portions of an object that stand out from a background, while the object mask 304 includes portions of an object that are separated from a background. In implementations, the object mask generation module 302 uses the region 220 to select an initial point or points in the digital image 202, and performs object recognition techniques upon the digital image 202 to identify an object that includes the initial point. The example segmentation map 222 of FIG. 2, for instance, includes a region 220 containing fingers. The example segmentation map 222 indicates that the skin portions of the fingers stand out against a background, however the fingernails do not stand out against a background. Thus, the region containing the fingers as described by the segmentation map 22 may not precisely represent the borders the fingers, as the region was generated to determine what portions of a digital image stand out rather than to determine edges of objects within a digital image. The object mask generation module 302 may use the region 220 as a starting point to initialize an object recognition technique to identify an object (e.g., the fingers) within the digital image 202.

The object mask generation module 302 uses the identified object within the digital image 202 to generate the object mask 304. The object mask 304 defines a portion of the digital image based on the area occupied by the identified object. In implementations, the object mask generation module 302 may further apply morphological operations to expand the bounds of the object mask 304, such as to expand the bounds of the object homogenously in all directions using a square kernel according to the following:

$$\text{Mask}_{pre} = \text{Segmentation}_{GraphBased}(\text{Regions})$$

$$\text{Mask}_{final} = \text{Morph}(\text{Mask}_{pre})$$

The object mask 304, in an implementation, defines an exact region to be filled, removed, or replaced in further operations by the artifact removal system 114. If the object mask 304 is smaller than a corresponding object in a digital image, replacing or filling the object mask 304 may introduce visually displeasing artifacts as an entirety of the visual object is not affected. However, if the object mask 304 is slightly larger than a corresponding visual object in a digital image, additional artifacts are not introduced when the object mask is replaced or filled. Accordingly, the object mask generation module 302 minimizes the introduction of artifacts and may overcome small errors or impurities in the determination of object boundaries by expanding the bounds of the object within the object mask 304 as described above.

An example object mask 306 is illustrated as corresponding to the region 220 depicted in the example segmentation map 222. While the region 220 in the example segmentation map 222 is a four sided convex polygon containing fingers, the example object mask 306 indicates an area with precise curves determined according to object boundaries of the fingers identified in the digital image 202. Black pixels in the example object mask 306 (e.g., the pixels representing the fingers) define pixels to be modified, e.g., filled. White pixels in the example object mask 306 define pixels that are not to be modified. It is to be appreciated that a plurality of different object masks 304 may be generated for different objects within a single digital image 202.

A sampling mask generation module 308 generates a sampling mask 310 for each of the object masks 304. The sampling mask 310 defines a sampling region to be used in conjunction with the corresponding object mask 304. The sampling mask generation module 308 begins with the application of morphological operations on the object mask 304 to expand the object mask 304 in all directions. The sampling mask generation module 308 may use, for instance, a square kernel. In implementations, the square kernel utilized by the sampling mask generation module 308 is bigger than the square kernel utilized by the object mask generation module 302, to increase a number of iterations of the morphological operations. The object mask 304 is then subtracted from the larger mask generated by the sampling mask generation module 308, resulting in the sampling mask 310. For example, subtraction of the object mask 304 may involve identifying pixel locations with a positive indication in the object mask 304 (e.g., black pixels), and marking each of those pixel locations with a negative indication in the sampling mask 310 (e.g., as white pixels). In this way, the sampling mask generation module 308 generates a sampling mask 310 that is a 'neighboring' mask to the object mask 304. The object mask 304 may be generated, for instance, according to:

$$Mask_{sampling} = Morph(Mask_{final}) - Mask_{final}$$

An example sampling mask 312 is illustrated as corresponding to the example object mask 306. While the example object mask 306 indicates a region including the fingers identified in the digital image 202, the example sampling mask 312 indicates a region surrounding the fingers identified the digital image 202. Black pixels in the example sampling mask 312 (e.g., pixels neighboring or surrounding the fingers) define pixels to be used as a sampling region. White pixels in the example object mask 306 define pixels that are not to be used as a sampling region. It is to be appreciated that a plurality of different sampling masks 310 may be generated for a single digital image 202, each corresponding to a different object mask 304. In this way, the mask generation module 118 may automatically determine both the object mask 304 and the sampling mask 310 without user intervention.

Figure 4:
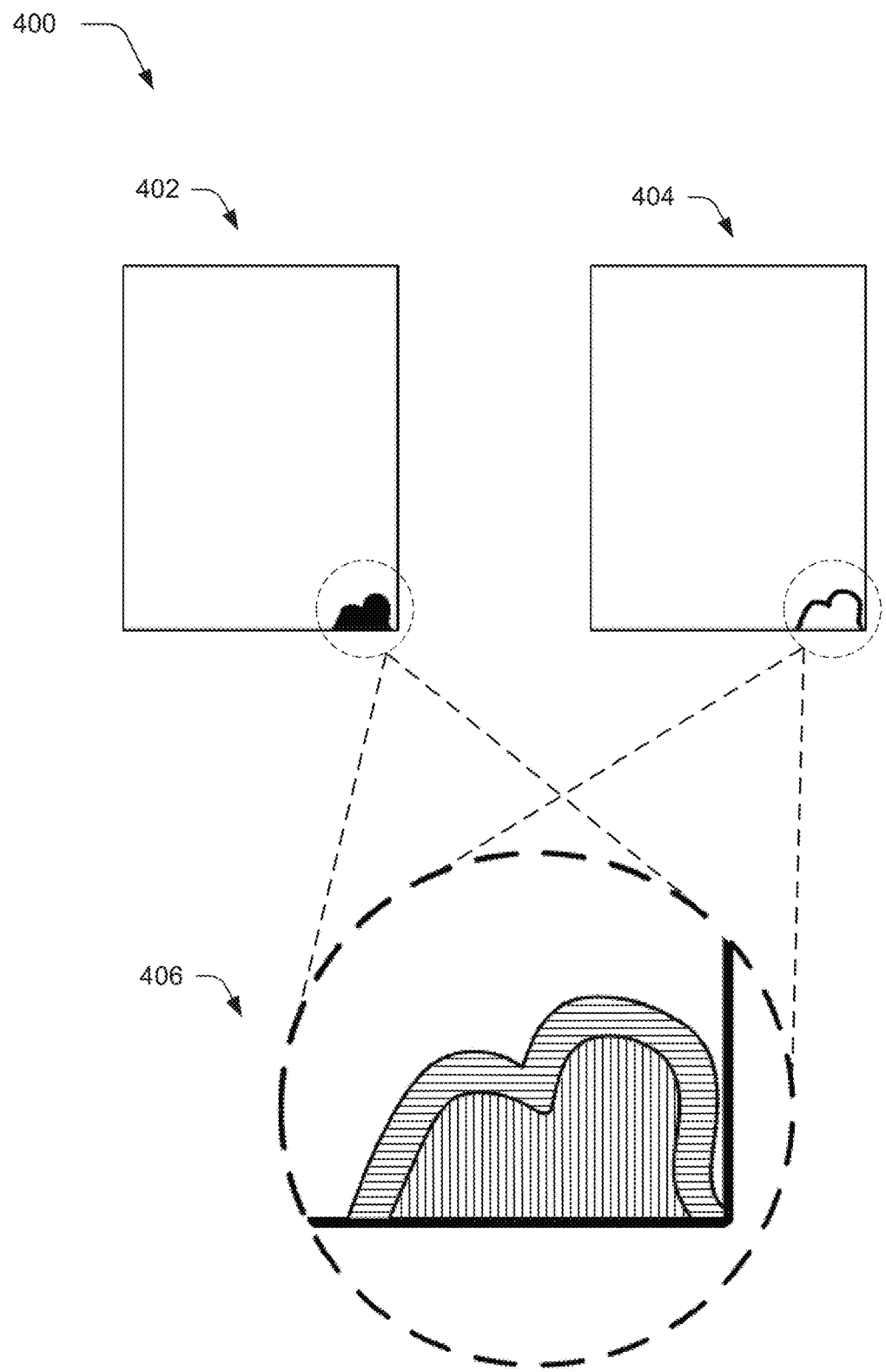
FIG. 4 depicts an example scenario illustrating an object mask and a sampling mask generated by the mask generation module.

FIG. 4 depicts an example scenario 400 to further illustrate the relationship between an object mask 402 and a sampling mask 404. In this example, the object mask 402 is the example object mask 306 of FIG. 3, and the sampling mask 404 is the example sampling mask 312 of FIG. 3. The object mask 402 and the sampling mask 404 each include a corresponding region with corresponding pixel locations, indicated with circles with dashed lines, which have been expanded and superimposed on top of each other in the illustrated region 406. In the region 406, black pixels of the object mask 402 are depicted as vertical striped lines, and black pixels of the sampling mask 404 are depicted as horizontal striped lines. The black pixels of the object mask 402 share a common boundary with the black pixels of the sampling mask 404, such that the black pixels of the sampling mask 404 may be visualized as an 'extension' of the object mask 402. However, there is no overlap between black pixels of the object mask 402 and black pixels of the sampling mask 404.

Figure 5:
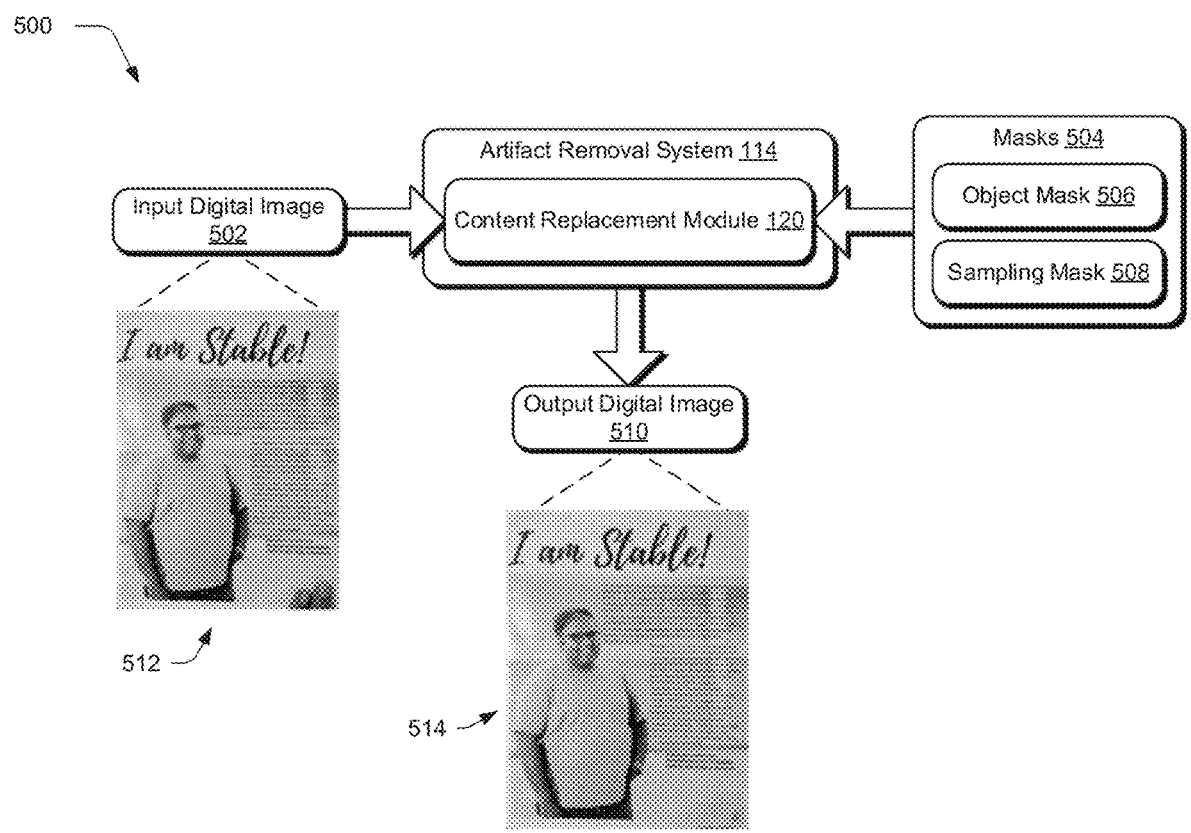
FIG. 5 depicts a system in an example implementation showing operation of a content replacement module to generate an output digital image from an input digital image, an object mask, and a sampling mask.

FIG. 5 depicts a system 500 showing an example content replacement processing pipeline of the content replacement module 120 of FIG. 1 in greater detail. The content replacement processing pipeline begins by receipt of an input digital image 502 and masks 504 by the content replacement module 120. The masks 504 include an object mask 506 and a sampling mask 508. For example, the input digital image 502 may be the digital image 202 of FIG. 2, the object mask 506 may be the object mask 304 of FIG. 3, and the sampling mask 508 may be the sampling mask 310 of FIG. 3. The content replacement module 120 applies the masks 504 as part of a content replacement technique on the input digital image 502 to generate an output digital image 510. As an example, the content replacement module 120 may utilize a content fill technique to generate the output digital image 510 according to:

$$Output_{final} = ContentFill(Image, Mask_{final}, Mask_{sampling})$$

In this example, the content fill operations applied by the content replacement module 120 use each pixel indicated by the sampling mask 508 as source material to replace each pixel indicated by the object mask 506. Pixels of the input digital image 502 at locations corresponding to the sampling mask 508 may thus be copied into pixels of the input digital image 502 at locations corresponding to the object mask 506. The content fill operations may involve a surround fill, a content-aware fill, and so forth. This process can be repeated for multiple sets of masks 504, such as to remove multiple different artifacts from a digital image.

The content replacement module 120 outputs the output digital image 510 as including the pixels of the input digital image 502 with an artifact removed or lessened using the masks 504. The content replacement module 120 can output the output digital image 510, for example, to a user interface of a computing device for output on a display device, to a storage element of a computing device, distribute the output digital image 510 to a service provider system or additional client devices via a network, and so forth. Using the techniques described herein, artifacts can be removed from digital images automatically and without user input. An example input digital image 502 is illustrated as the example input digital image 512, and an example output digital image 510 is illustrated as the example output digital image 514. The example input digital image 512 is the example digital image 204 of FIG. 2, and depicts a document as well as fingers occluding the document in the bottom right corner. The artifact removal system 114 has identified the occluding fingers by utilizing the region identification module 116 as described with respect to FIG. 2, and has generated masks 504 by utilizing the mask generation module 118 as described with respect to FIG. 3. The content replacement module 120 has used the masks 504 to modify the example input digital image 512 to remove the fingers, and generated the example output digital image 514. The example output digital image 514 includes the document depicted in the example input digital image 512, but does not include the occluding fingers.

In implementations, the artifact removal system 114 is implemented as part of a printing device configured to transform digital media into a physical representation of the digital media (e.g., conversion of digital media into ink on paper). For example, the artifact removal system 114 may be included as part of an embedded print engine provided for inclusion in a Raster Image Processor (RIP). In such implementations, the printing device receives the input digital image 502 as a printing input. Automatically and without user intervention, the printing device utilizes the artifact removal system 114 to create the output digital image 510. Rather than printing the input digital image 502 that includes an artifact, the printing device prints the output digital image 510 having an effect of the artifact lessened and/or removed. In this way, a printing device may receive an input digital image 502 that includes an artifact, automatically remove the artifact with the content replacement module 120, and print the output digital image 510 without the artifact. However, it is to be appreciated that the artifact removal system 114 may operate with varying degrees of user input or visual output in a user interface. For example, the artifact removal system 114 may be implemented as a part of an image capture device and configured to operate automatically and without user intervention upon capturing a digital image. In another example, the artifact removal system 114 may be implemented as part of an image editing application and configured to operate responsive to a user input to remove artifacts.

Figure 6A:
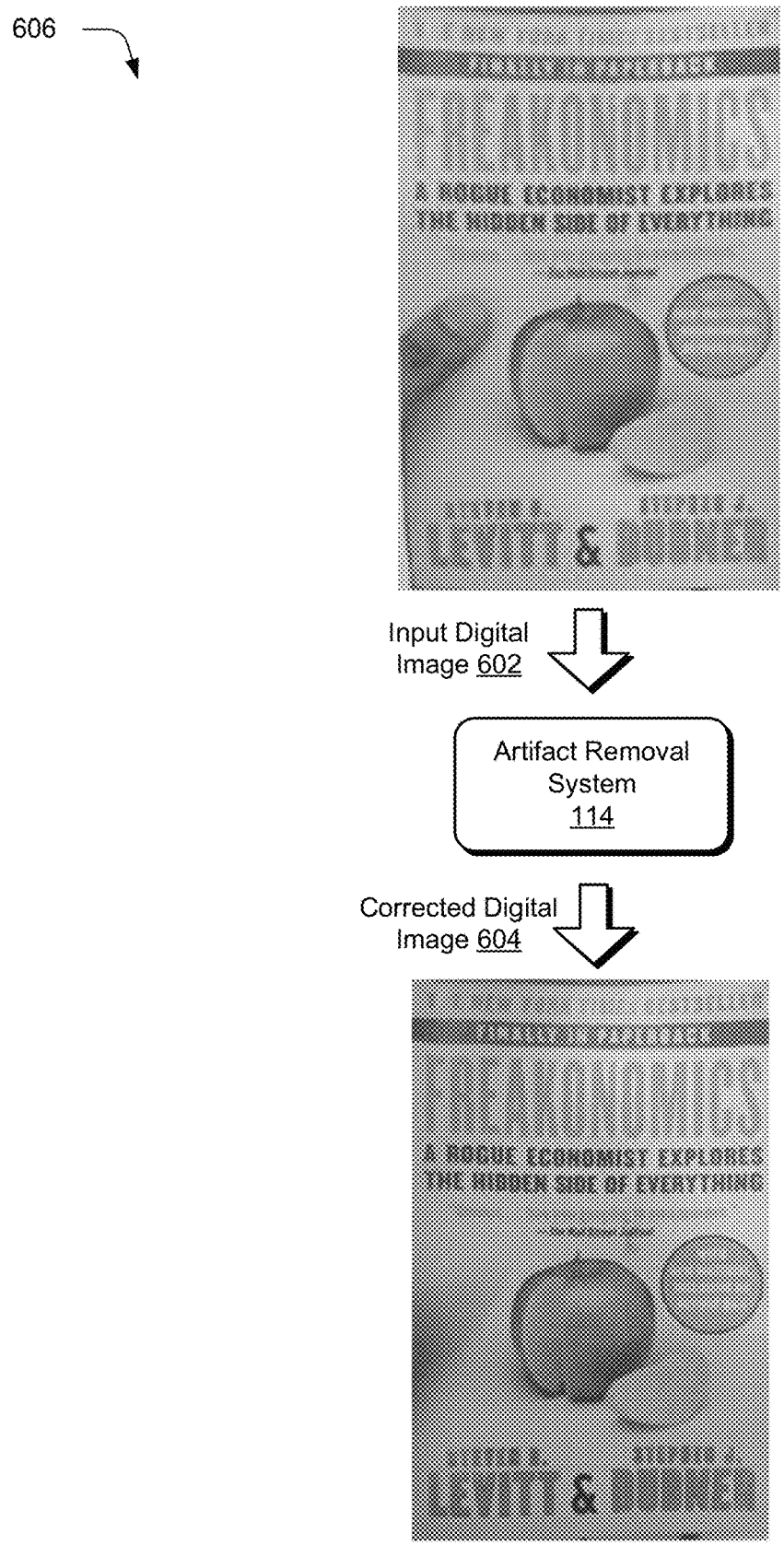
FIGS. 6A, 6B, and 6C depict example input digital images and output corrected digital images in an example implementation of automatic artifact removal techniques.
Figure 6B:
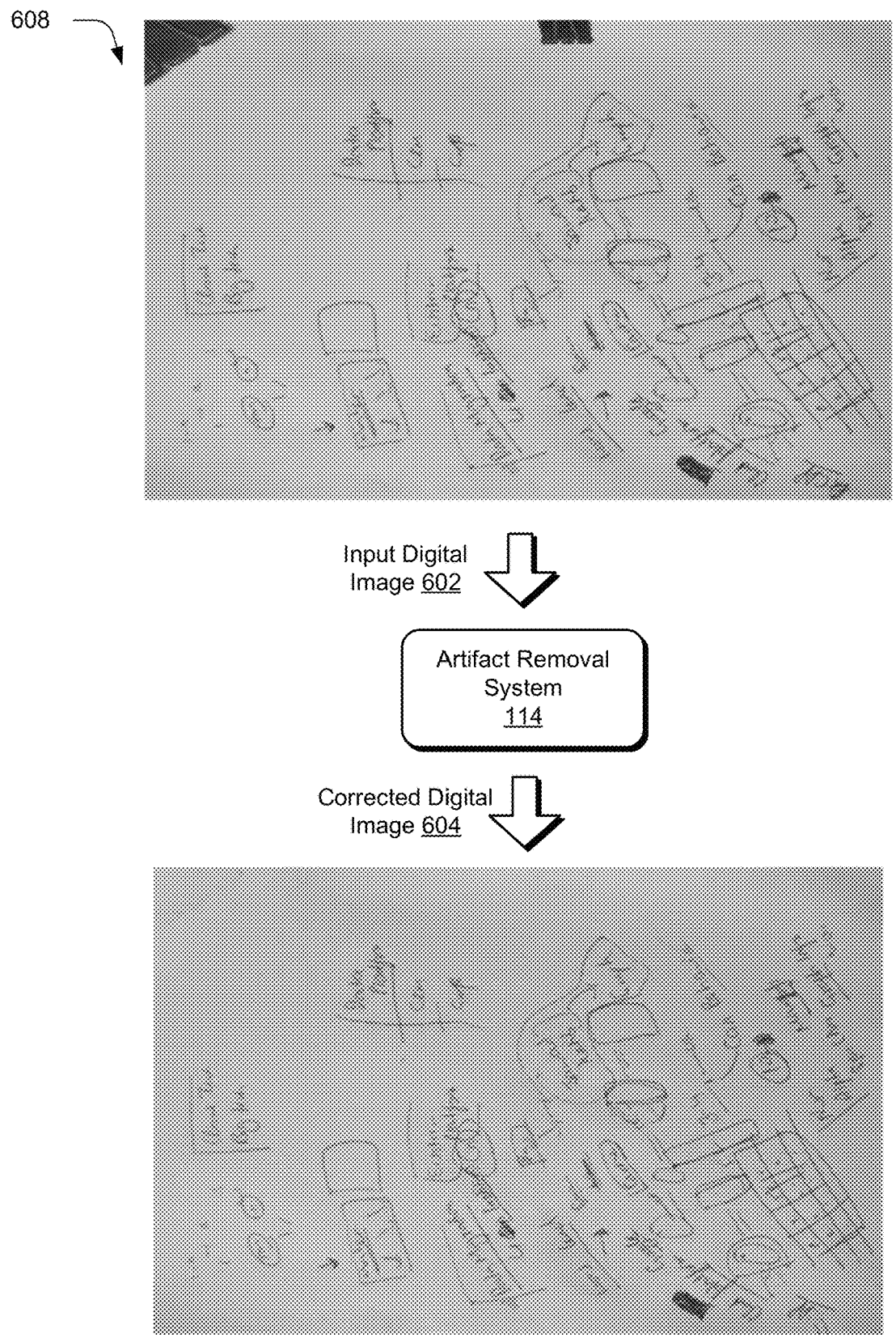
Figure 6C:
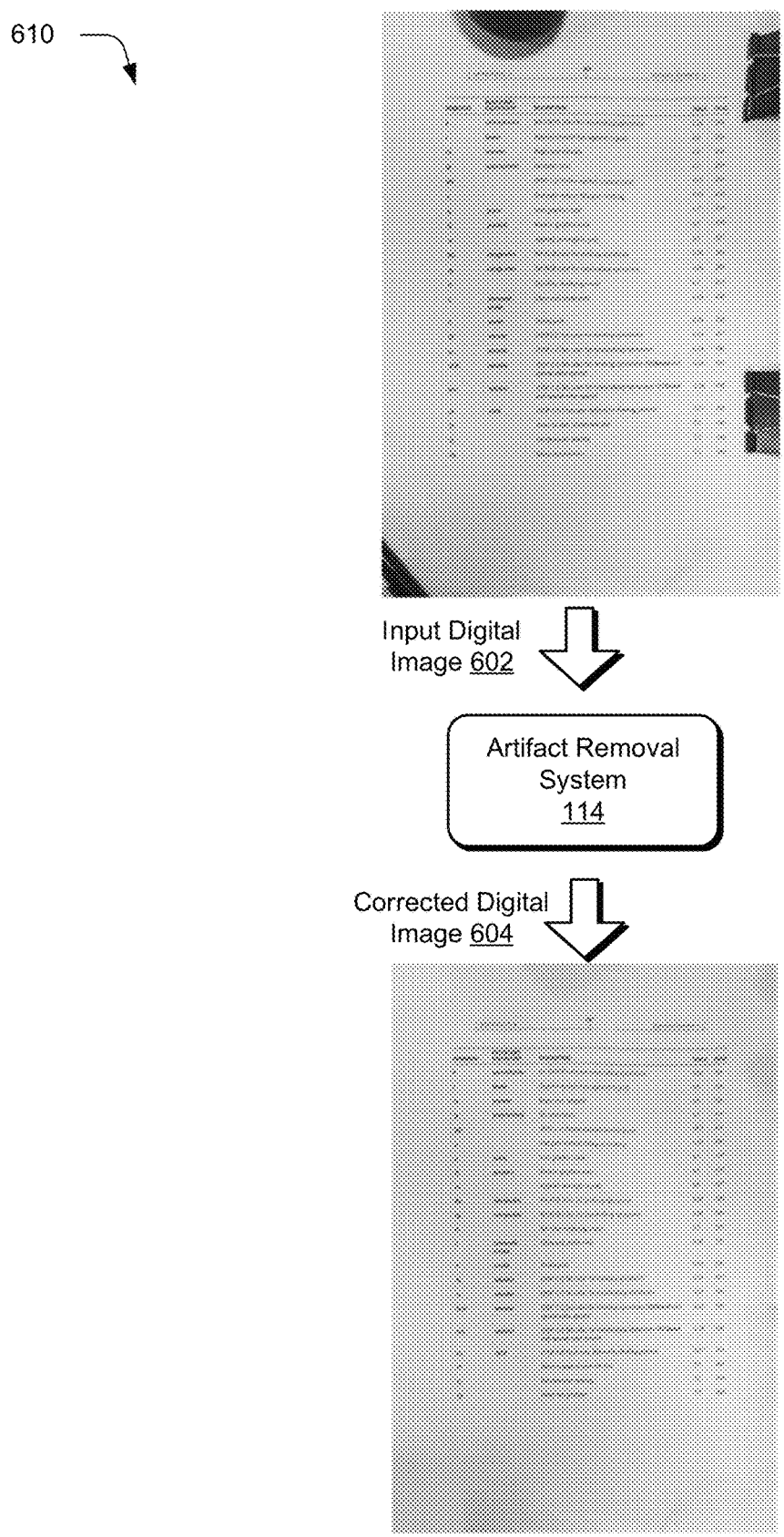

FIGS. 6A, 6B, and 6C illustrate further examples of automatic artifact removal as implemented by the artifact removal system 114 of FIG. 1. In these illustrated examples, the artifact removal system 114 receives an input digital image 602 that includes an artifact, and generates a corrected digital image 604 that does not include the artifact. In at least some implementations, the artifact removal system 114 generates a corrected digital image 604 based on the input digital image 602 as generally described with reference to FIGS. 1-5. For example, the artifact removal system 114 processes the input digital image 602 with the region identification module 116 to generate a region 220 as described with respect to FIG. 2, processes the region 220 with the mask generation module 118 to generate an object mask 304 and a sampling mask 310 as described with respect to FIG. 3, and processes the input digital image 602 along with the object mask 304 and the sampling mask 310 with the content replacement module 120 as described with respect to FIG. 5 to generate the corrected digital image 604. Three different examples of a respective input digital image 602 and corrected digital image 604 are shown in the illustrated examples of FIGS. 6A, 6B, and 6C.

In an example 606 of 6A, the input digital image 602 includes a document with various text features and a digital image of an apple. The input digital image 602 further includes an occlusion of a finger on the left side of the document. The artifact removal system 114 has performed automatic artifact removal techniques to remove the occlusion, and outputs the corrected digital image 604 which does not include the occluding finger on the left side of the document.

In an example 608 of 6B, the input digital image 602 includes a document with various hand-written features. The input digital image 602 further includes occlusions of a binder clip in the top left corner and a binder clip on the top edge of the document. The artifact removal system 114 has performed automatic artifact removal techniques to remove the occlusions, and outputs the corrected digital image 604 which does not include either of the occluding binder clips.

In an example 610 of 6C, the input digital image 602 includes a document with a variety of text features in a table format. The input digital image 602 further includes occlusions of two rectangular binder clips on the right edge of the document, a portion of a pen near the bottom-left corner of the document, and a circular paperweight on the top edge of the document. The artifact removal system 114 has performed automatic artifact removal techniques to remove the occlusions, and outputs the corrected digital image 604 which does not include either of the occluding binder clips, the pen, or the paperweight.

Example Procedures

The following discussion describes techniques that may be implemented utilizing the previously described systems and devices. Aspects of each of the procedures may be implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference will be made to FIGS. 1-6.

Figure 7:
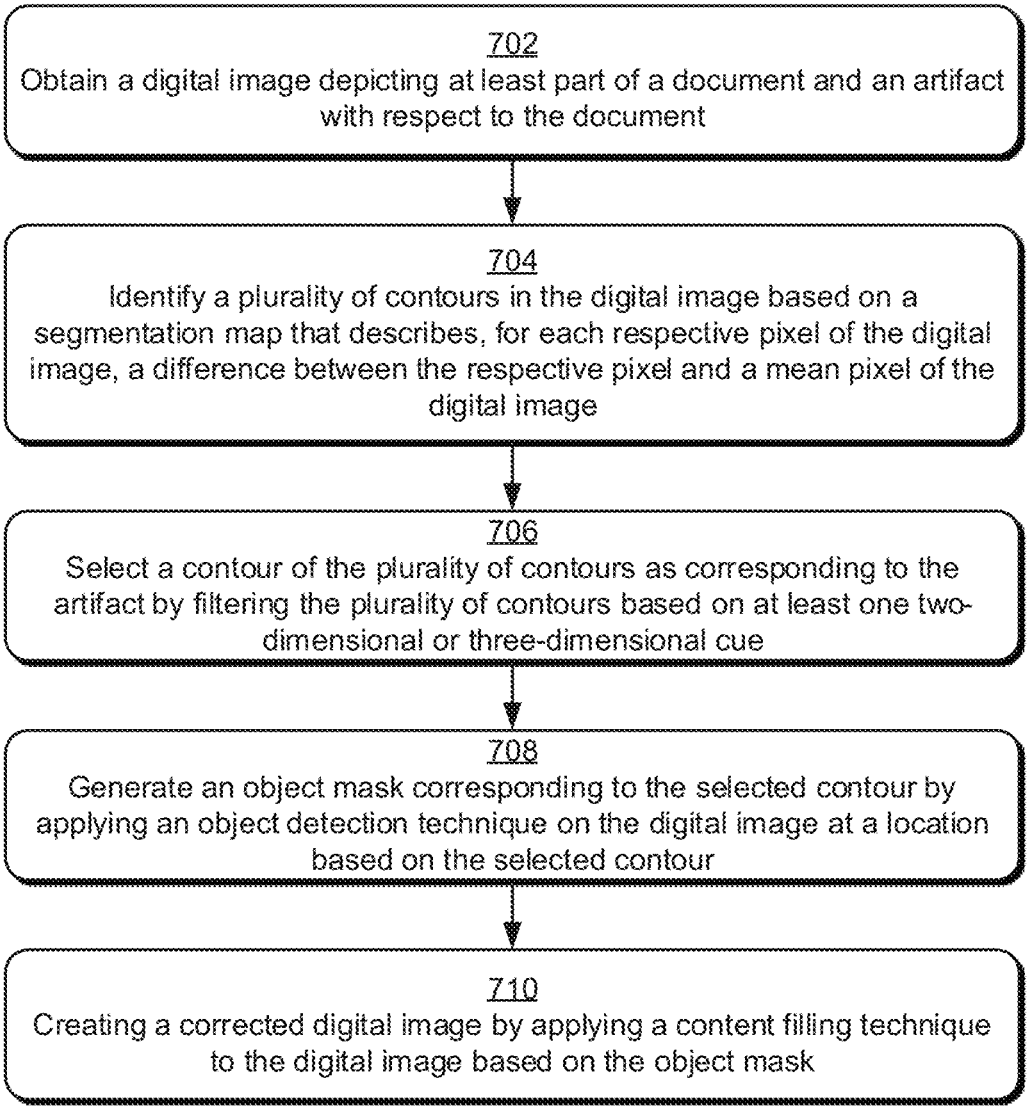
FIG. 7 is a flow diagram depicting a procedure in an example implementation of automatic artifact removal.

FIG. 7 depicts a procedure 700 in an example implementation in which an artifact is removed from a digital document using automatic artifact removal techniques by an artifact removal system. A digital image is obtained that depicts at least part of a document and an artifact with respect to the document (block 702) by the artifact removal system. The digital image may, for instance, be included as part of a printing input, may be captured by an image capture device, may be received from a computing device via a network, and so forth. The artifact may be caused by an occluding object that obstructs a portion of the document in the digital image.

A plurality of contours are identified in the digital image by the artifact removal system based on a segmentation map that describes, for each respective pixel of the digital image, a difference between the respective pixel and a mean pixel of the digital image (block 704). This may include generating the segmentation map, such as described with respect to FIG. 2. To do so, the digital image may be blurred. The blurred digital image and the digital image are converted into an LAB color space, and mean pixel values are determined for the digital image. A distance map is generated indicating a distance between each pixel in the blurred digital image and the mean pixel. The segmentation map is generated by applying adaptive thresholding techniques to the distance map. For instance, the adaptive thresholding may be based on a combination of a mean and a standard deviation of pixel values in the distance map.

A contour is selected by the artifact removal system from the plurality of contours as corresponding to the artifact by filtering the plurality of contours based on at least one two-dimensional or three-dimensional cue (block 706). The at least one two dimensional or three dimensional cue, for example, includes at least one of a shadow associated with the selected contour, a depth of the selected contour, a position of the contour, an area of the contour, an aspect ratio of the contour, a distance from the contour to the edge of the segmentation map, a length or height of the contour, and a color variance in the digital image at a location corresponding to the contour.

An object mask is generated corresponding to the selected contour by applying an object detection technique on the digital image at a location based on the selected contour (block 708) by the artifact removal system. For instance, graph-based segmentation techniques are utilized to create a graph with similar pixels in order to identify the bounds of an object, and the object mask is generated based on the bounds of the object. A sampling mask may be generated corresponding to the object mask by applying morphological operations to the object mask to generate an enlarged mask, and subtracting the object mask from the enlarged mask.

A corrected digital image is created by applying a content filling technique to the digital image based on the object mask to remove the artifact (block 710) by the artifact removal system. In implementations, the content filling technique uses pixels in the sampling mask as replacement pixels in the object mask to remove the artifact. Output of the digital image may include displaying the corrected digital image on a display device of a computing device, storing the corrected digital image in a memory device of a computing device, communicating the corrected digital image to another computing device via a network, transmitting the corrected digital image to a printing device for creation of a physical representation of the corrected digital image, and so forth. In implementations, the corrected digital image is created by a component of a printing device, and the corrected digital input is printed as a physical representation without storage as a digital image.

Example System and Device

Figure 8:
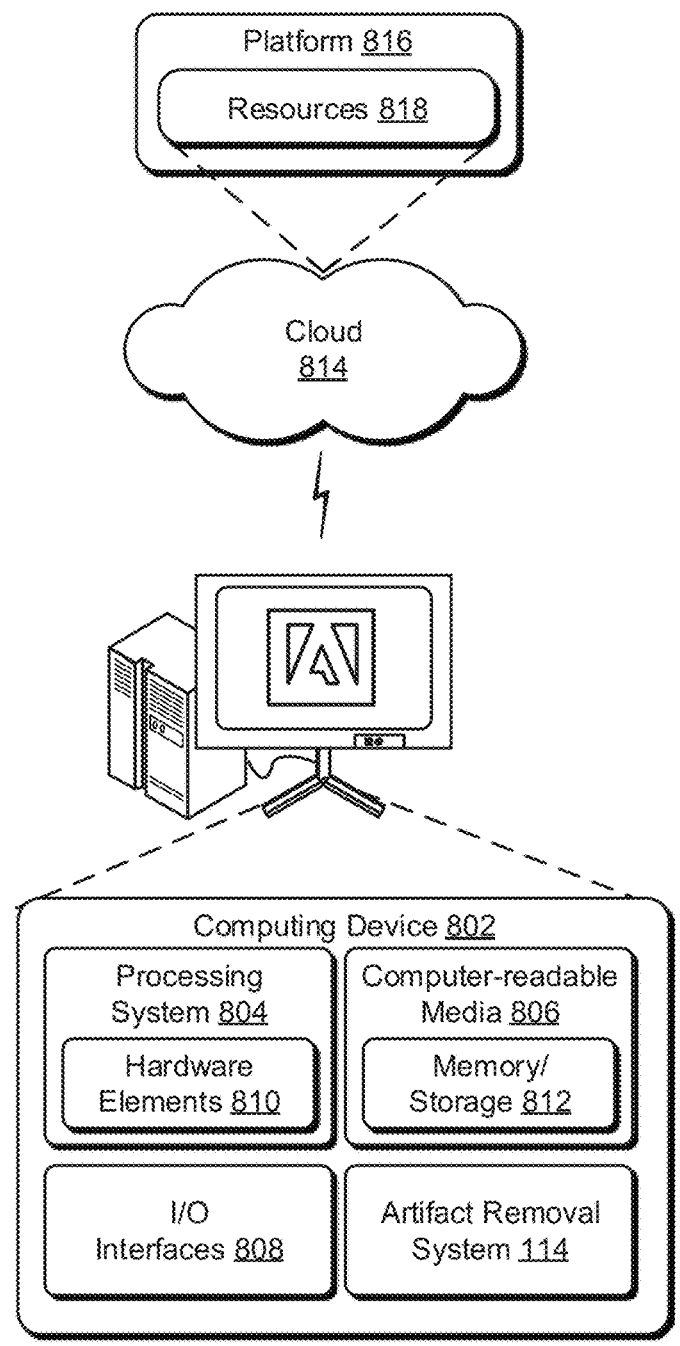
FIG. 8 illustrates an example system including various components of an example device that can be implemented as any type of computing device as described and/or utilized with reference to FIGS. 1-7 to implement embodiments of the techniques described herein.

FIG. 8 illustrates an example system generally at 800 that includes an example computing device 802 that is representative of one or more computing systems and/or devices that may implement the various techniques described herein. This is illustrated through inclusion of the artifact removal system 114. The computing device 802 may be, for example, a server of a service provider, a device associated with a client (e.g., a client device), an on-chip system, and/or any other suitable computing device or computing system.

The example computing device 802 as illustrated includes a processing system 804, one or more computer-readable media 806, and one or more I/O interface 808 that are communicatively coupled, one to another. Although not shown, the computing device 802 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 804 is representative of functionality to perform one or more operations using hardware. Accordingly, the processing system 804 is illustrated as including hardware element 810 that may be configured as processors, functional blocks, and so forth. This may include implementation in hardware as an application specific integrated circuit or other logic device formed using one or more semiconductors. The hardware elements 810 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 806 is illustrated as including memory/storage 812. The memory/storage 812 represents memory/storage capacity associated with one or more computer-readable media. The memory/storage component 812 may include volatile media (such as random access memory (RAM)) and/or nonvolatile media (such as read only memory (ROM), Flash memory, optical disks, magnetic disks, and so forth). The memory/storage component 812 may include fixed media (e.g., RAM, ROM, a fixed hard drive, and so on) as well as removable media (e.g., Flash memory, a removable hard drive, an optical disc, and so forth). The computer-readable media 806 may be configured in a variety of other ways as further described below.

Input/output interface(s) 808 are representative of functionality to allow a user to enter commands and information to computing device 802, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 802 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 802. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 802, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 810 and computer-readable media 806 are representative of modules, programmable device logic and/e; fixed device logic implemented in a hardware form that may be employed some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 810. The computing device 802 may be configured to implement particular instructions and/or functions corresponding to the software and/or hardware modules. Accordingly, implementation of a module that is executable by the computing device 802 as software may be achieved at least partially in hardware, e.g., through use of computer-readable storage media and/or hardware elements 810 of the processing system 804. The instructions and/or functions may be executable/operable by one or more articles of manufacture (for example, one or more computing devices 802 and/or processing systems 804) to implement techniques, modules, and examples described herein.

The techniques described herein may be supported by various configurations of the computing device 802 and are not limited to the specific examples of the techniques described herein. This functionality may also be implemented all or in part through use of a distributed system, such as over a "cloud" 814 via a platform 816 as described below.

The cloud 814 includes and/or is representative of a platform 816 for resources 818. The platform 816 abstracts underlying functionality of hardware (e.g.; servers) and software resources of the cloud 814. The resources 818 may include applications and/or data that can be utilized while computer processing is executed on servers that are remote from the computing device 802. Resources 818 can also include services provided over the Internet and/or through a subscriber network, such as a cellular or Wi-Fi network.

The platform 816 may abstract resources and functions to connect the computing device 802 with other computing devices. The platform 816 may also serve to abstract scaling of resources to provide a corresponding level of scale to encountered demand for the resources 818 that are implemented via the platform 816. Accordingly, in an interconnected device embodiment, implementation of functionality described herein may be distributed throughout the system 800. For example, the functionality may be implemented in part on the computing device 802 as well as via the platform 816 that abstracts the functionality of the cloud 814.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In a digital medium artifact removal environment, a method implemented by a computing device, the method comprising:

obtaining, by the computing device, a digital image depicting at least part of a document and an artifact with respect to the document;

identifying, by the computing device, a plurality of contours in the digital image based on a segmentation map that describes, for each respective pixel of the digital image, a difference between the respective pixel and a mean pixel of the digital image;

selecting, by the computing device, a contour of the plurality of contours as corresponding to the artifact by filtering the plurality of contours based on at least one two-dimensional or three-dimensional cue;

generating, by the computing device, an object mask corresponding to the selected contour by applying an object detection technique on the digital image at a location based on the selected contour;

creating, by the computing device, a corrected digital image by applying a content filling technique to the digital image based on the object mask.

2. The method of claim 1, further comprising detecting, prior to the identifying, that the digital image depicts a document.

3. The method of claim 1, further comprising generating the segmentation map by generating a distance map indicating a distance between each respective pixel and the mean pixel.

4. The method of claim 3, further comprising generating, prior to the generating the segmentation map, a blurred digital image based on the digital image, and wherein the distance is between a respective pixel in the blurred digital image and the mean pixel of the digital image.

5. The method of claim 4, wherein the generating the segmentation map further includes applying adaptive thresholding to the distance map.

6. The method of claim 5, wherein the adaptive thresholding is based on a combination of a mean and a standard deviation of pixel values in the distance map.

7. The method of claim 1, wherein the at least one two dimensional or three dimensional cue includes at least one of a shadow associated with the selected contour, a depth of the selected contour, a position of the contour, an area of the contour, an aspect ratio of the contour, a distance from the contour to the edge of the segmentation map, a length or height of the contour, and a color variance in the digital image at a location corresponding to the contour.

8. The method of claim 1, further comprising generating a sampling mask corresponding to the object mask by applying a morphological operation to the object mask to generate an enlarged object mask and subtracting the object mask from the enlarged object mask, and wherein the content filling technique is further based on the sampling mask.

9. The method of claim 1, wherein the at least one computing device is a printing device and the digital image is received as a printing input, and further comprising printing the corrected digital image.

10. In a digital medium environment for digital image artifact removal, a system comprising:

a region identification module implemented at least partially in hardware of a computing device to:

receive a printing input including a digital image depicting at least part of a document and an artifact with respect to the document;

identify a plurality of contours in the digital image based on a segmentation map that describes, for each respective pixel of the digital image, a difference between the respective pixel and a mean pixel of the digital image; and select a contour of the plurality of contours as corresponding to the artifact by filtering the plurality of contours based on at least one two-dimensional or three-dimensional cue;

a mask generation module implemented at least partially in hardware of a computing device to:

generate an object mask corresponding to the selected contour by applying an object detection technique on the digital image at a location based on the selected contour; and generate a sampling mask corresponding to the object mask by applying a morphological operation to the object mask to generate an enlarged object mask and subtracting the object mask from the enlarged object mask; and a content replacement module implemented at least partially in hardware of a computing device to:

create a corrected digital image by applying a content filling technique to the digital image based on the object mask and the sampling mask to remove the artifact.

11. The system of claim 10, the region identification module further configured to detect, prior to the identifying, that the digital image depicts a document.

12. The system of claim 10, the region identification module further configured to generate the segmentation map by generating a distance map indicating a distance between each respective pixel and the mean pixel.

13. The system of claim 12, the region identification module further configured to generate, prior to the generating the segmentation map, a blurred digital image based on the digital image, and wherein the distance is between a respective pixel in the blurred digital image and the mean pixel of the digital image.

14. The system of claim 13, wherein the generating the segmentation map further includes applying adaptive thresholding to the distance map.

15. The system of claim 14, wherein the adaptive thresholding is based on a combination of a mean and a standard deviation of pixel values in the distance map.

16. The system of claim 10, wherein the at least one two dimensional or three dimensional cue includes at least one of a shadow associated with the selected contour, a depth of the selected contour, a position of the contour, an area of the contour, an aspect ratio of the contour, a distance from the contour to the edge of the segmentation map, a length or height of the contour, and a color variance in the digital image at a location corresponding to the contour.

17. In a digital medium environment for digital image artifact removal, a system comprising:

means for receiving a printing input including a digital image depicting at least part of a document and an artifact;

means for identifying a plurality of contours in the digital image based on a segmentation map that describes, for a respective pixel of the digital image, a difference between the respective pixel and a mean pixel of the digital image;

means for selecting a contour of the plurality of contours as corresponding to the artifact by filtering the plurality of contours based on at least one multidimensional cue;

means for generating an object mask corresponding to the selected contour by applying an object detection technique on the digital image at a location based on the selected contour;

means for generating a sampling mask corresponding to the object mask by applying a morphological operation to the object mask to generate an enlarged object mask and subtracting the object mask from the enlarged object mask;

means for creating a corrected digital image by applying a content filling technique to the digital image based on the object mask and the sampling mask to remove the artifact; and means for printing the corrected digital image.

18. The system of claim 17, wherein the means for identifying the plurality of contours includes means for blurring the digital image, generating a distance map indicating a distance between each respective pixel of the blurred digital image and the mean pixel of the digital image, and applying adaptive thresholding to the distance map.

19. The system of claim 18, wherein the adaptive thresholding is based on a combination of a mean and a standard deviation of pixel values in the distance map.

20. The system of claim 17, wherein the at least one two dimensional or three dimensional cue includes at least one of a shadow associated with the selected contour, a depth of the selected contour, a position of the contour, an area of the contour, an aspect ratio of the contour, a distance from the contour to the edge of the segmentation map, a length or height of the contour, and a color variance in the digital image at a location corresponding to the contour.

* * * * *